United States Patent
Maslov et al.

(10) Patent No.: US 7,650,203 B2
(45) Date of Patent: Jan. 19, 2010

(54) FOOT STRUCTURE FOR HUMANOID ROBOT AND ROBOT WITH THE SAME

(75) Inventors: Leonid Maslov, Gyeonggi-do (KR); Young Son, Gyeonggi-do (KR); Joo-young Kwak, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 853 days.

(21) Appl. No.: 11/024,815

(22) Filed: Dec. 30, 2004

(65) Prior Publication Data
US 2005/0173164 A1  Aug. 11, 2005

(30) Foreign Application Priority Data
Feb. 6, 2004  (KR) .............. 10-2004-0007855

(51) Int. Cl.
*B62D 51/06*  (2006.01)
*A61F 2/68*  (2006.01)
*F16M 13/00*  (2006.01)

(52) U.S. Cl. .......... 700/245; 180/8.5; 180/8.6; 248/619; 248/677; 623/53; 901/50

(58) Field of Classification Search ........... 180/8.1, 180/8.2, 8.5, 8.6; 700/245, 261; 318/568.12, 318/568.16; 901/48, 28, 50; 248/615, 677, 248/188.9, 188.1, 600, 619, 688, 583, 646, 248/647, 648, 649, 651, 653, 654, 663, 665, 248/673, 676, 687, 693, 576; 623/27, 32, 623/36, 44, 47, 53, 52, 55, 56; 267/33
See application file for complete search history.

(56) References Cited

U.S. PATENT DOCUMENTS

| | | | | | |
|---|---|---|---|---|---|
| 4,510,957 | A | * | 4/1985 | Frank | 135/84 |
| 5,307,828 | A | * | 5/1994 | Gardner et al. | 135/82 |
| 5,310,157 | A | * | 5/1994 | Platus | 248/619 |
| 5,416,393 | A | * | 5/1995 | Gomi et al. | 318/568.2 |

(Continued)

FOREIGN PATENT DOCUMENTS

JP  11-033941 A  2/1999

OTHER PUBLICATIONS

Korean Office Action dated Oct. 28, 2005 (with English translation).

(Continued)

*Primary Examiner*—Thomas G Black
*Assistant Examiner*—Christine M Behncke
(74) *Attorney, Agent, or Firm*—Staas & Halsey LLP

(57) ABSTRACT

Provided is a foot structure for a humanoid robot capable of effectively keeping its balance in a pause state or action. The foot structure includes a support; a plurality of lower structures having an upper member connected to a bottom of the support; a plurality of lower members having a plurality of independent portions each movably connected to the upper member; and a revolute joint for coupling the upper member and the lower member. Since a contact between the foot structure and the floor is smoothly made, a shock is prevented from being transferred to a body of the humanoid robot. Also, a vibration generated when the humanoid robot steps on the floor is eliminated, so that the humanoid robot can pose a stable and smooth gate.

18 Claims, 15 Drawing Sheets

U.S. PATENT DOCUMENTS

| | | | | | |
|---|---|---|---|---|---|
| 5,445,249 | A | * | 8/1995 | Aida et al. | 188/378 |
| 6,377,014 | B1 | | 4/2002 | Gomi et al. | |
| 7,424,930 | B2 | * | 9/2008 | Bizlewicz | 181/207 |
| 2003/0213623 | A1 | * | 11/2003 | Axakov et al. | 177/229 |
| 2003/0230700 | A1 | * | 12/2003 | Kemeny | 248/677 |
| 2005/0016778 | A1 | * | 1/2005 | Kitano et al. | 180/8.1 |

OTHER PUBLICATIONS

Kazuo Hirai et al., "The Development of Honda Humanoid Robot", IEEE International Conference on Robotics and Automation, May 1998, pp. 1321-1326.

Kenji Kaneko et al., "Design of Advanced Leg Module for Humanoid Robotics Project of METI", IEEE International Conference on Robotics and Automation, May 2002, pp. 38-45.

Jin'ichi Yamaguchi et al., "Experimental Development of a Foot Mechanism with Shock Absorbing Material for Acquisition of Landing Surface Position Information and Stabilization of Dynamic Biped Walking", IEEE International Conference on Robotics and Automation, 1995, pp. 2892-2899.

* cited by examiner

FOOT STRUCTURE FOR HUMANOID ROBOT AND ROBOT WITH THE SAME

Priority is claimed to Korean Patent Application No. 2004-7855, filed on Feb. 6, 2004, in the Korean Intellectual Property Office, the disclosure of which is incorporated herein in its entirety by reference.

BACKGROUND OF THE INVENTION

1. Field of the Invention

The present invention relates to a humanoid robot, and more particularly, to a foot structure for a humanoid robot capable of effectively keeping its balance in a pause state and/or action state.

2. Description of the Related Art

Robots are generally utilized for factory automation and play an important role in non-human environments. Recently, humanoid robot systems are being actively developed because robots capable of performing in a human environment such as offices, homes, or hospitals are desired. Accordingly, some humanoid robots have been developed.

One of most important conditions of a humanoid robot is to guarantee an effective interaction between a foot of the robot and the ground. If there is no effective interaction between the foot of the robot and the ground, a shock is generated when a heel of the robot's foot touches on the ground, and is then transferred to the robot's foot. Furthermore, the shock is transferred to the robot's body through an ankle joint. Due to such a shock, the dynamic equilibrium of the robot may be disturbed and an unstable gait of the robot may be caused. In addition, a vibration of the foot resulted from the shock is transferred to the body of the robot, thereby lowering a control stability of the robot.

Another problem resulted from the unstable interaction between the robot's foot and the ground occurs when the robot passes an area where small obstacles exist on the ground or a surface of the ground is not flat, even though the robot may use a vision system for assessing the surroundings. In this case, the robot's foot does not adequately step on the ground, which deteriorates the stability and spontaneity of the gait of the robot.

In order to solve the above problems, several robot's foot mechanisms capable of absorbing a shock during walking have been proposed. Among them are the foot structures disclosed in the article "The development of Honda humanoid robot" by K. Hirai et al., Proceedings of the 1998 IEEE International Conference on Robotics & Automation, Leuven, Belgium, May 1998, and U.S. Pat. No. 6,377,014, "Legged walking robot" issued to Gomi et al., on Jun. 23, 2002.

FIG. 1 is a cross-sectional view illustrating a structure of a conventional robot foot disclosed by K. Hirai et al.

Referring to FIG. 1, a foot 10 includes a sole 14 made of rubber and a bushing 12 having a guide shape and made of rubber, thereby constructing a mechanism capable of absorbing a shock. The foot 10 of the robot is elastically deformed in a vertical direction by a ground force applied from the sole 14. With the above construction, the transfer of an impact load is reduced, since the foot serves mechanically as a low-pass filter to prevent the vibration of a leg so that the leg can be smoothly controlled.

However, the foot 10 does not provide a stable walking mechanism. For this, the rubber used for the sole 14 and the bushing 12 has to have high elasticity in order to secure the stability of the upper portion of the robot relative to the sole 14 so that a tight contact between the sole 14 and the ground can be achieved.

Consequently, the total stiffness of the foot is increased and becomes approximately a constant regardless of a value of the ground force. Therefore, this type of shock-absorbing apparatus has a disadvantage in that it cannot effectively attenuate the vibration generated after a shock is applied to the heel of the robot.

In order to overcome the above problem, U.S. Pat. No. 6,377,014 teaches a robot foot having a sole consisting of a first elastic portion and a second elastic portion, and the second elastic portion having a heel portion consisting of a flat central portion of a relatively thin thickness and a plurality of projections of a relatively thick thickness which are spaced apart from each other at regular intervals.

Meanwhile, a structure of a humanoid robot employing a six-axis force sensor that makes the robot walk stably on a rough and flat terrain is disclosed in the article "Design of advanced leg module for humanoid robotics project of METI," by Kenji Kaneko et al., Proceedings of the 2002 IEEE International Conference on Robotics & Automation, Washington, D.C., May 2002.

FIG. 2 is an explanatory view depicting a foot structure of the conventional robot of using a six-axis force sensor.

As shown in FIG. 2, a foot 20 of the robot includes a six-axis force sensor 22, a plurality of rubber bushes 24, and a sole plate 26. It is very important to control a torque of the sole in order to make the robot walk stably on rough terrain. Since the plurality of bushes 24 serve as a compliance element with a roll axis and a pitch axis, the rotational deformation of the plurality of bushes 24 is controlled by the 6-axis force sensor 22, thereby controlling the torque applied to the sole of the robot.

In addition, WAF-2 (Waseda Anthropomorphic Foot No. 2), an advanced foot structure for a humanoid robot, and a controlling system for the WAF-2 are disclosed in the article "Experimental development of a foot mechanism with shock absorbing material for acquisition of landing surface position information and stabilization of dynamic biped walking," by Jinichi Yamaguchi et al., IEEE International Conference on Robotics & Automation, pp 2892-2899 (1995).

FIG. 3A is a view depicting a structure 30 of WAF-2.

As shown in FIG. 3A, the WAF-2 structure 30 includes an upper foot plate 40, four potentiometers 36 placed on the upper foot plate 40, four wires 38 penetrating the upper foot plate 40, a plurality of upper stoppers 50 placed under the upper foot plate 40, a shock-absorbing member 44 positioned under the upper foot plate 40, a first acrylic plate 42 positioned between the upper foot plate 40 and the shock-absorbing member 44, a lower foot plate 62, a second acrylic plate 46 placed between the lower foot plate 62 and the shock-absorbing member 44, a plurality of lower stoppers 60 placed on the lower foot plate 62, and a plurality of spikes 64 formed under the lower foot plate 62.

FIG. 3B is a perspective view depicting one of the plurality of upper stoppers 50 placed under the upper foot plate 40 in FIG. 3A.

As shown in FIG. 3B, the upper stopper 50 consists of a duralumin 52, a urethane rubber 54, a Teflon resin 56, and a silicon foam 58.

As shown in FIGS. 3A and 3B, the WAF-2 structure 30 has a passive shock-absorbing mechanism achieved by the shock-absorbing member 44 placed between the upper foot plate 40 and the lower foot plate 62 and the plurality of upper stoppers 50 placed under the upper foot plate 40. In the case of a ground force having a nonlinear characteristic where the foot stiffness is gently increases with the ground force, such a structure can provide a shock-absorbing mechanism. In addition, this structure provides a stabilizing function by the upper stoppers 50 and the lower stoppers 60 placed on the spikes 64, and the upper foot plate 40 and the lower foot plate 62, respectively.

A two-legged robot using this structure can easily operate on a surface having variations of a few millimeters in a vertical or horizontal direction or at an inclination angle of about 1°.

However, the humanoid robots employing the WAF-2 or WAF-3 structure have several drawbacks.

The humanoid robot has a nonlinear stiffness characteristic similar to a human being only at a nominal load corresponding to a robot having a weight of about 110 kg and within a range of 6 mm. In other words, the maximum stiffness of the foot is equal to 91.7 N/mm under a restricted condition. If the maximum ground force is above the value, the upper foot plate is completely contacted with the lower foot plate. Thus, an average stiffness of the foot is determined by a metal portion having high stiffness and low damping.

In addition, since the WAF-2 or WAF-3 structure utilizes a shock-absorbing material, such as a yellow memory foam M-36, the elastic characteristic varies. A heater is mounted in the foot structure to maintain the temperature in about 40° C., so as to prevent variations of the elastic characteristic. Thus, the foot structure is heavy and very complicated.

Finally, since the WAF-2 or WAF-3 structure has no toe joints, the robot cannot secure a tight contact between the ground and the foot in a push-off motion during walking. Therefore, the robot cannot secure a sufficient propelling force required for quick walk, run, carrying a load, or the like.

SUMMARY OF THE INVENTION

The present invention provides a foot structure for a robot capable of providing a stable and smooth gait and a robot employing the foot structure.

Also, the present invention provides a foot structure for a robot capable of effectively absorbing a shock and assuring a stable robot posture when a load is lifted from the floor.

According to an aspect of the present invention, there is provided a foot structure for a robot, the foot structure comprising: a support for mounting an ankle joint of the robot; and a plurality of lower structures connected to a bottom portion of the support for absorbing a shock and stabilizing a gait of the robot.

According to another aspect of the present invention, there is provided a robot including at least one body and a plurality of legs, each leg using a foot structure comprising: a support for mounting an ankle joint of the robot; and a plurality of lower structures connected to a bottom portion of the support for absorbing a shock and stabilizing a gait of the robot, each the lower structure including an upper member connected to the bottom portion of the support; a plurality of lower members having a plurality of independent portions each movably connected to an upper member; and a revolute joint for coupling the upper member and the lower member.

According to another aspect of the present invention, in order to effectively absorb a shock and provide a stable robot posture when a load is lifted from the floor, there is provided a robot structure comprising an upper member to hold the load, a plurality of independent portions, a lower member having a plurality of linear springs for movably coupling the independent portions to each other, and a revolute joint for coupling the upper member to the lower member.

The robot of the present invention has a stiffness characteristic identical to that of a human being. Particularly, the robot has a constant stiffness, when receiving an impact load, a stable standing posture, and a smooth contact between a heel and ground.

Since the robot includes a shock-absorbing and stabilizing mechanism (SASM) capable of providing an additional rotational DOF and translational DOF, the foot structure can properly contact the floor when the robot performs various human-like motions. Consequently, the robot has a stability even on an uneven floor or a floor with small obstacles thereon.

Also, since the foot structure of the present invention includes a quasi-toe joint, a foot's sole can properly contact the floor while pushing off the floor.

In addition, since the foot structure of the present invention employs a shock-absorbing material to absorb a soft shock very well, after the foot structure steps on the floor, a high frequency vibration of the foot structure in a high frequency band is reduced.

Furthermore, because of the interaction between the foot structure and the floor to smoothly absorb the impact therebetween, the impact is not transferred to a body of the robot, and the vibration generated when the foot structure contacts the floor is attenuated, thereby stabilizing a gait of the robot.

Finally, in the case where the robot walks on an uneven floor or a floor with small obstacles, the foot structure is less sensitive to irregularities of the floor, and thus the control of the robot could be simplified to stabilize a gait of the robot.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
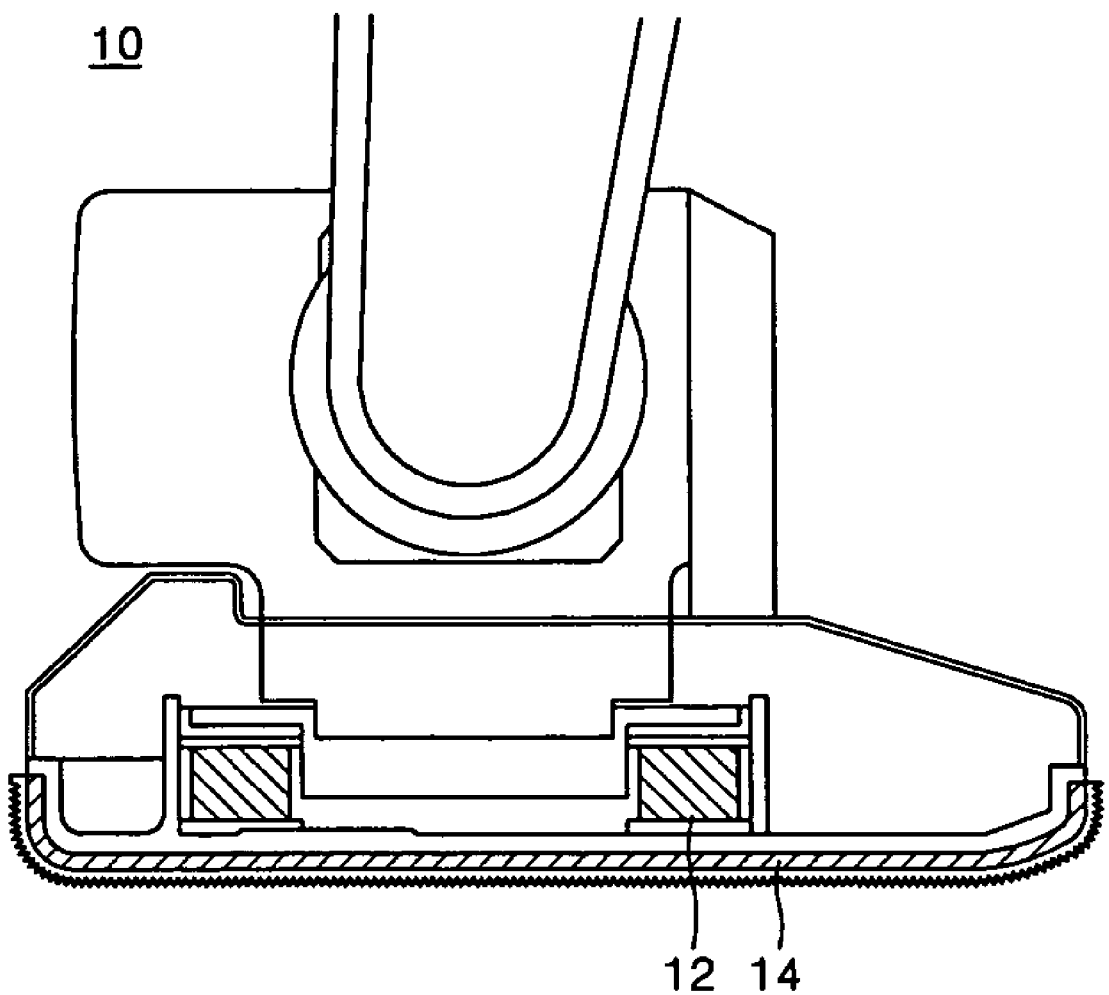
FIG. 1 is a cross-sectional view illustrating a structure of a conventional robot foot.
Figure 2:
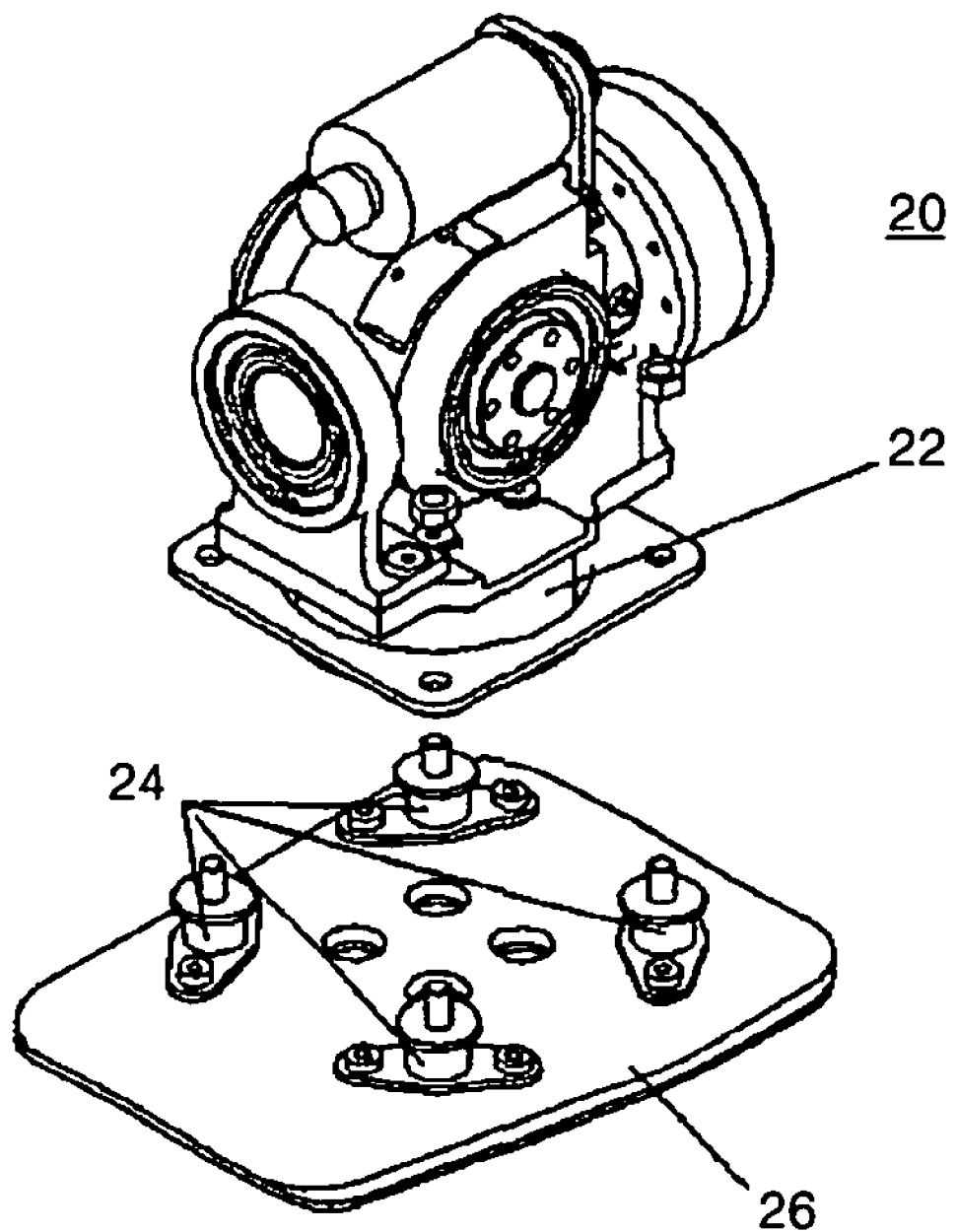
FIG. 2 is a view depicting a conventional robot foot structure using a six-axis force sensor.
Figure 3A:
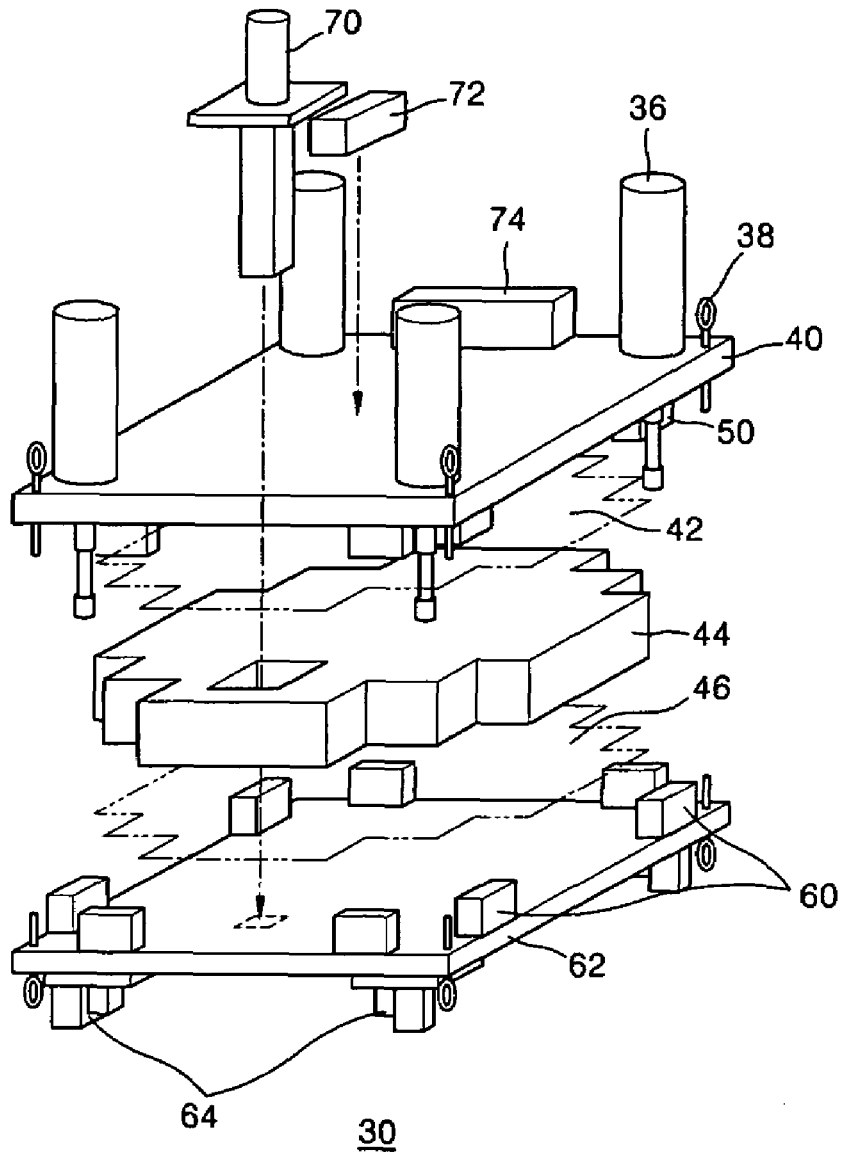
FIG. 3A is a view depicting the WAF-2 structure.
Figure 3B:
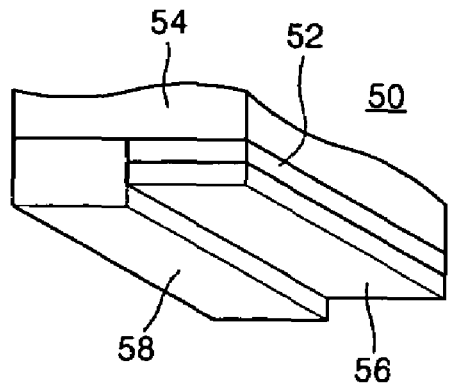
FIG. 3B is a perspective view depicting one of a plurality of upper stoppers formed under an upper foot plate in FIG. 3A.

Reference will now be made in detail to a foot structure for a humanoid robot according to an embodiment of the present invention. In the accompanying drawings, like parts are indicated by the same reference numerals.

Figure 4:
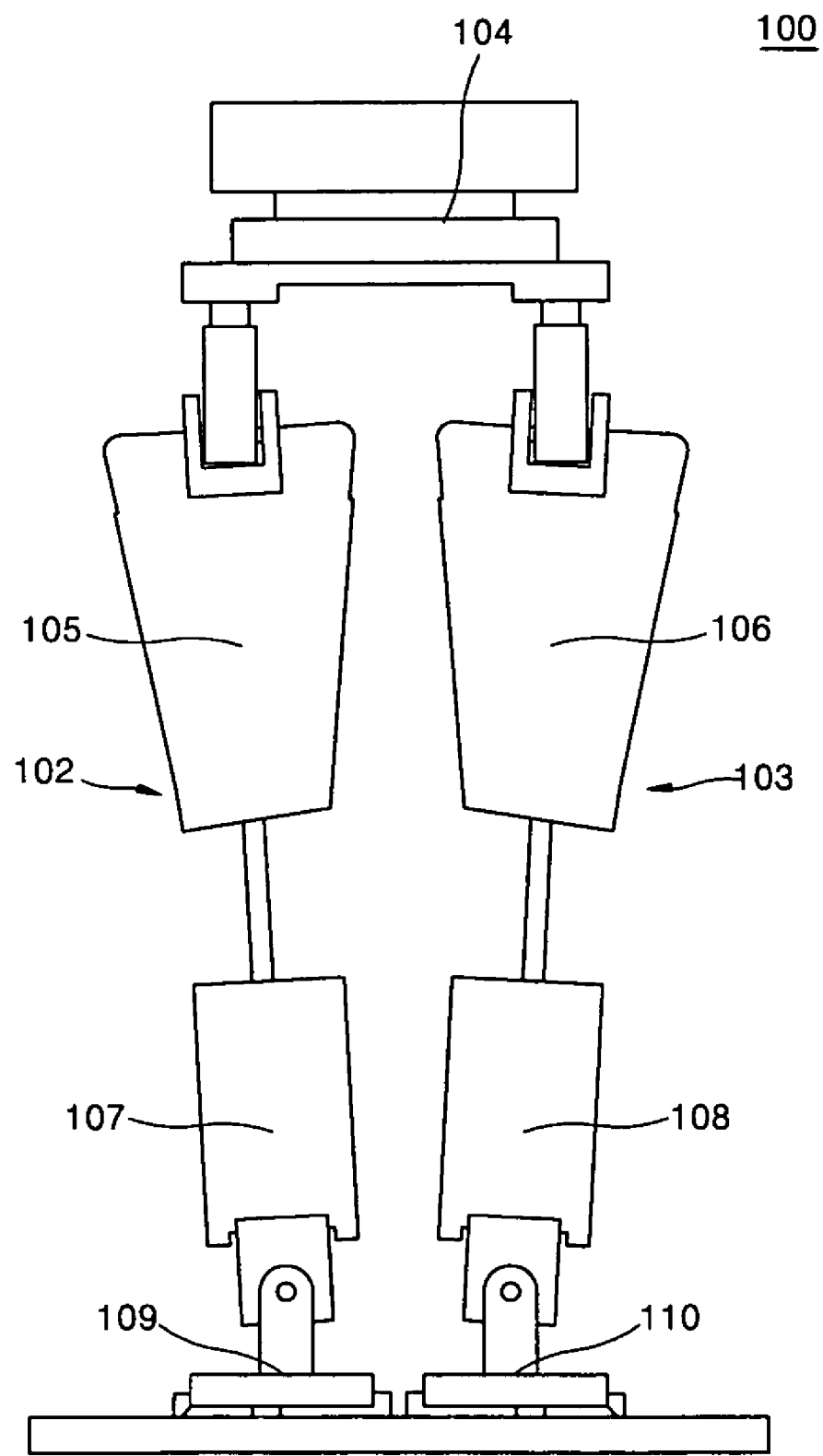
FIG. 4 is a view depicting a humanoid robot employing a foot structure according to an embodiment of the present invention.

FIG. 4 is a view depicting a humanoid robot employing a foot structure 100 according to an embodiment of the present invention.

The humanoid robot 100 includes two legs 102 and 103 and a waist 104.

Each of the legs 102 and 103 includes thighs 105 and 106, shins 107 and 108, and foot structures 109 and 110, respectively. The legs 102 and 103 and foot structures 109 and 110 are identical to each other and are symmetrically displaced. Accordingly, only the foot structure 110 of the leg 103 will now be described in detail.

Figure 5A:
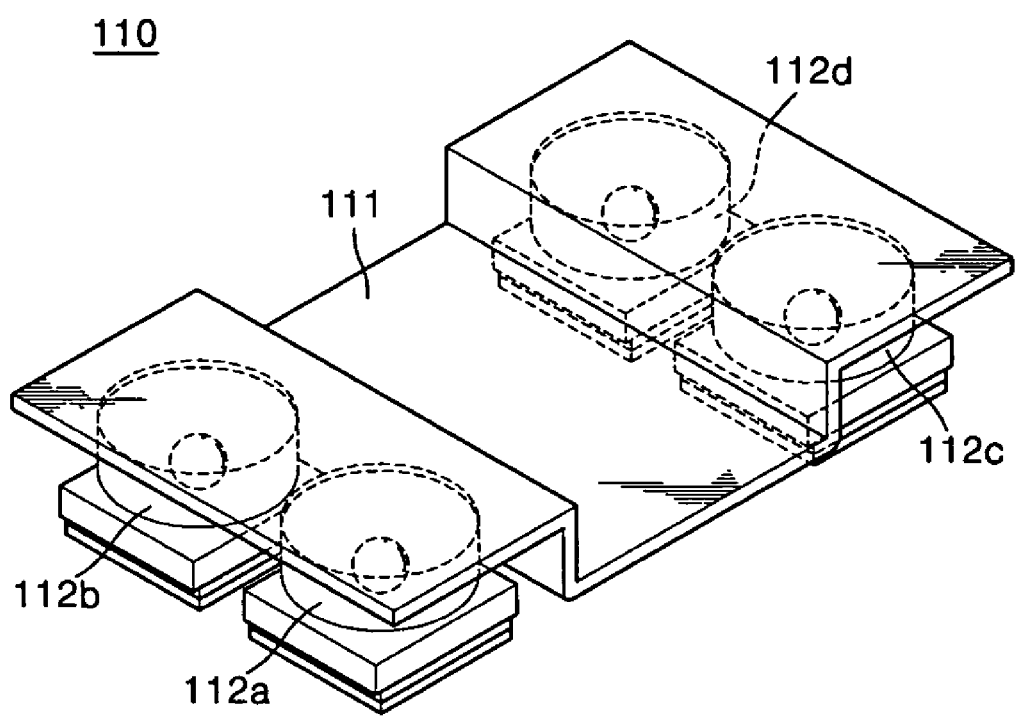
FIG. 5A is a perspective view depicting the foot structure of FIG. 4.
Figure 5B:
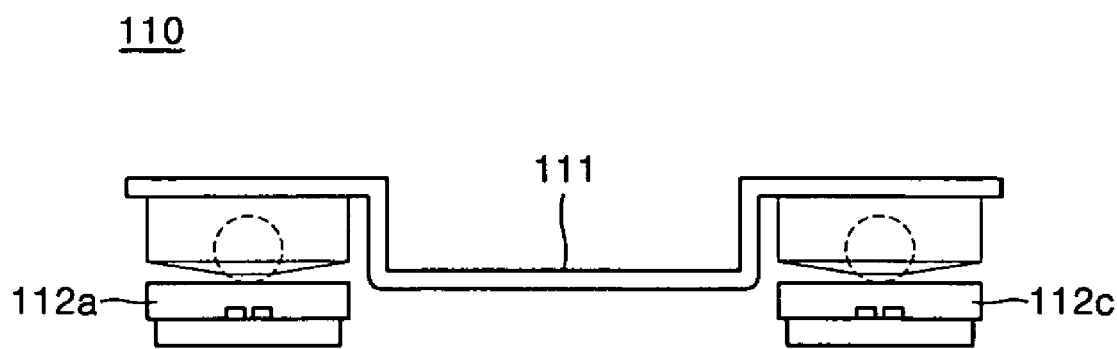
FIG. 5B is a side view of the foot structure according to the embodiment of the present invention.

FIG. 5A and FIG. 5B are respectively a perspective view and a cross-sectional view depicting the foot structure.

As shown in FIGS. 5A and 5B, the foot structure 110 includes a carrier plate 111 for mounting a 6-axis force sensor and an ankle joint of the humanoid robot 100, and four shock-absorbing and stabilizing mechanisms (SASMs) 112a through 112d installed under the carrier plate 111.

According to an embodiment of the present invention, the foot structure 110 has the dimensions of 235×150×50 mm, and each SASM 112a through 112d has the dimensions of 60×60×50 mm.

According to an embodiment of the present invention, the carrier plate 111 may be made of an aluminum alloy, a material identical to that used to make the general structure of the humanoid robot 100, or other suitable material.

Figure 5C:
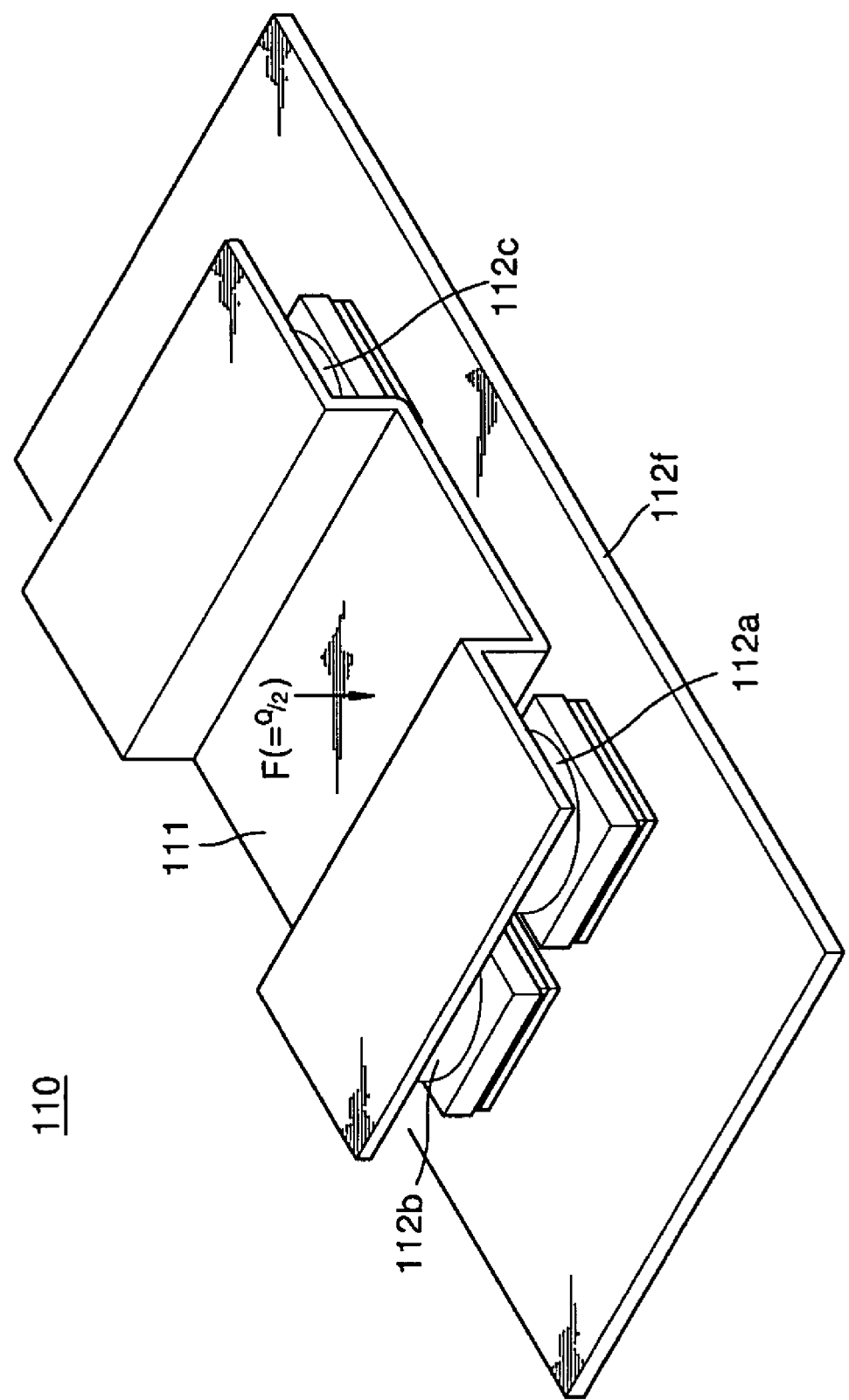
FIG. 5C is a perspective view depicting a force applied to a carrier plate when the foot structure in FIG. 5A touches the ground.

FIG. 5C is a perspective view depicting a force applied to the carrier plate 111 when the foot structure in FIG. 5A completely touches the ground.

As shown in FIG. 5C, a nominal force F applied to the carrier plate 111 when the humanoid robot 100 stands on a floor 112f is half the weight of the humanoid robot 100.

Figure 6A:
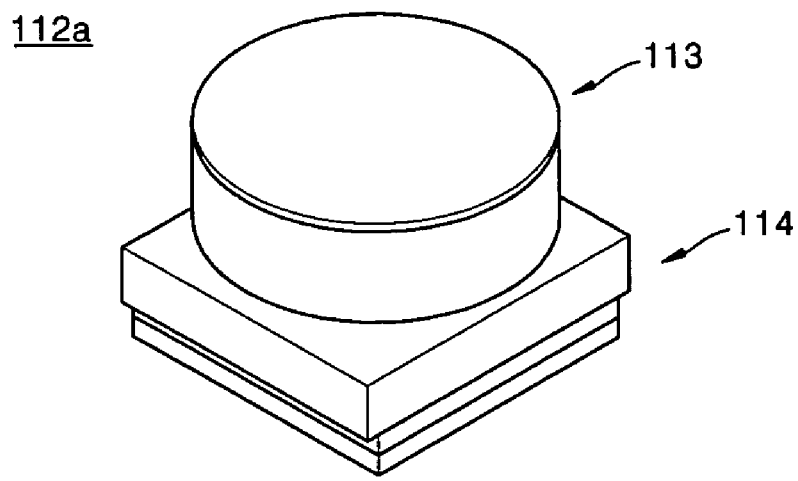
FIG. 6A is a perspective view depicting a shock-absorbing and stabilizing mechanism (SASM) of the foot structure in FIG. 5A.
Figure 6B:
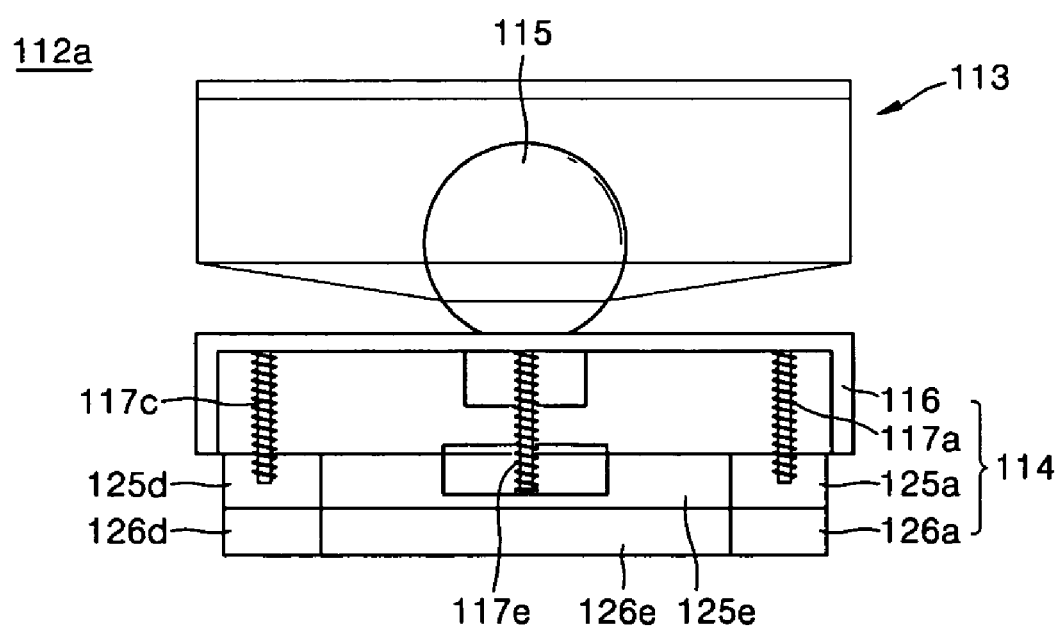
FIG. 6B is a cross-sectional view depicting the SASM of the foot structure in FIG. 5A.
Figure 6C:
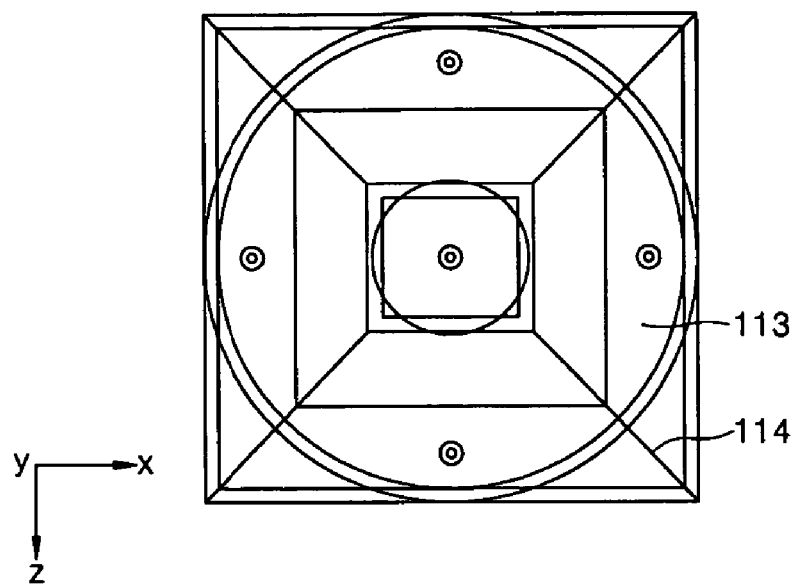
FIG. 6C is a plan view depicting the SASM of the foot structure in FIG. 5A.

FIGS. 6A, 6B, and 6C are a perspective view, a cross-sectional view and a plan view depicting the SASM 112 of the foot structure in FIG. 5A, respectively.

As shown in FIGS. 6A through 6C, the SASM 112a includes an upper member 113, a lower member 114, and a spherical joint 115. In addition, the lower member 114 includes a lower cover 116, a plurality of linear springs 117a through 117e, a metal member consisting of a plurality of metal portions 125a through 125e, and a plurality of rubber portions 126a through 126e.

Figure 7:
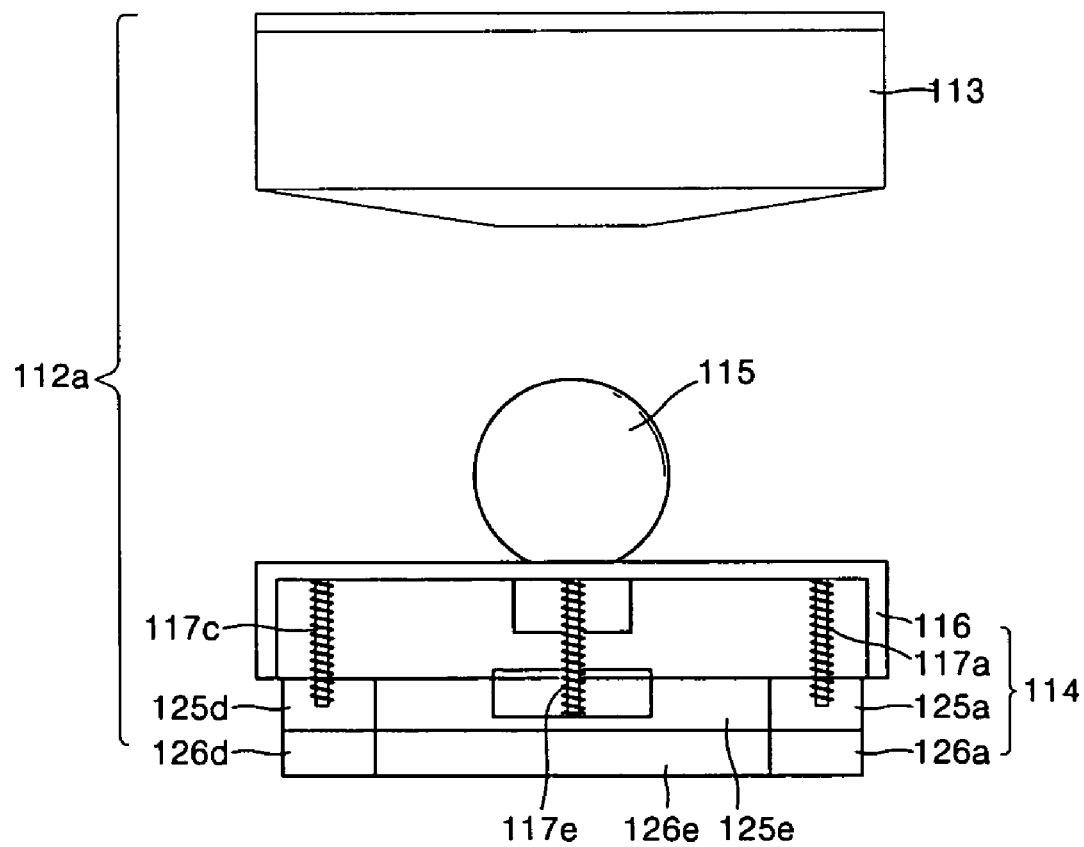
FIG. 7 is a view depicting a SASM model obtained by using ADAMS (commercially available code from MSC Software Corporation) where an upper member is separated from a lower member in the SASM.

FIG. 7 is a view depicting a case where the upper member 113 is separated from the lower member 114 in the SASM 112a.

Figure 8:
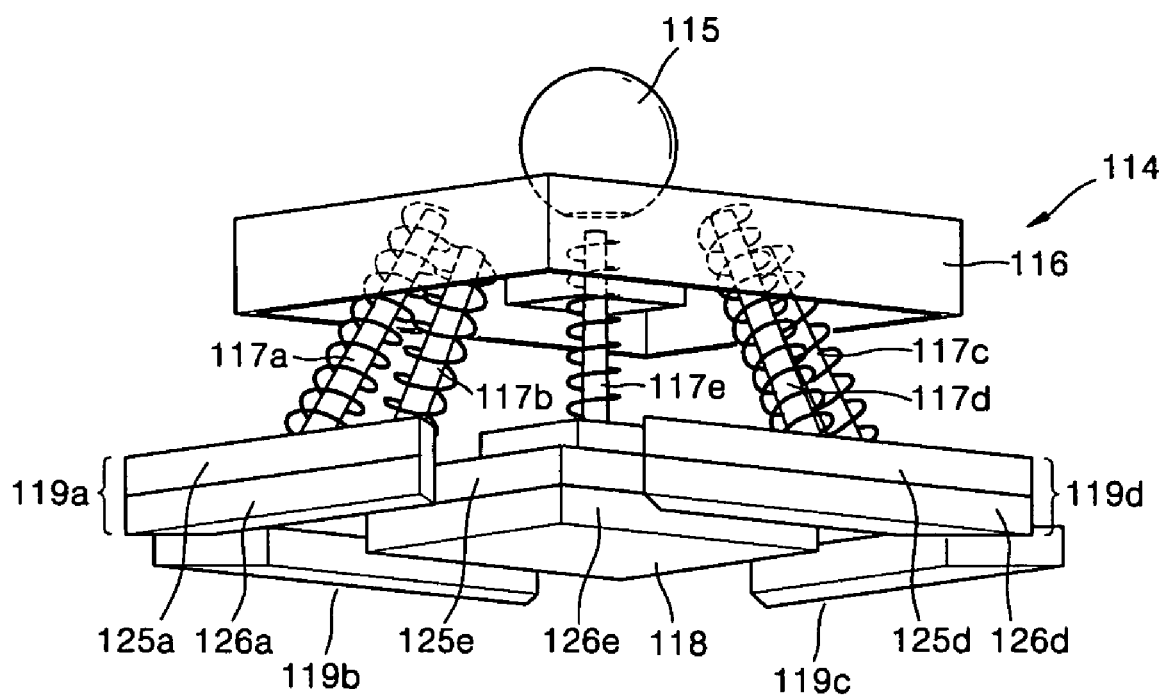
FIG. 8 is a perspective view depicting the lower member of the SASM in FIGS. 6A through 6C.

FIG. 8 is a perspective view depicting the lower member 114 of the SASM 112a in FIGS. 6A through 6C.

As shown in FIG. 8, the lower member 114 includes the lower cover 116, five independent portions 118 and 119a through 119d, and the plurality of linear springs 117a through 117e. The independent portions 118 and 119a through 119d respectively have the metal portions 125a to 125e and the rubber portions 126a to 126e. In addition, according to an embodiment of the present invention, in order to enable translational motion along a vertical axis within a desired range, the independent portions 118 and 119a through 119d are connected to each other by the linear springs 117a to 117e.

According to an embodiment of the present invention, all of the metal portions 125a through 125e moving relative to and contacting the ground surface are adhered to the rubber portions 126a through 126e made of thermoplastic rubber. The spherical joint 115 is fixed to a cover by a screw (not shown).

According to an embodiment of the present invention, the independent portions 118 and 119a through 119d have a height of 10 mm. That is, the rubber portions 126a through 126e have a height of 5 mm, and the metal portions 125a through 125e made of aluminum alloy have a height of 5 mm. A moving range of the independent portion 118 is 5 mm, and a moving range of the remaining independent portions 119a to 199d is 10 mm.

Figure 9:
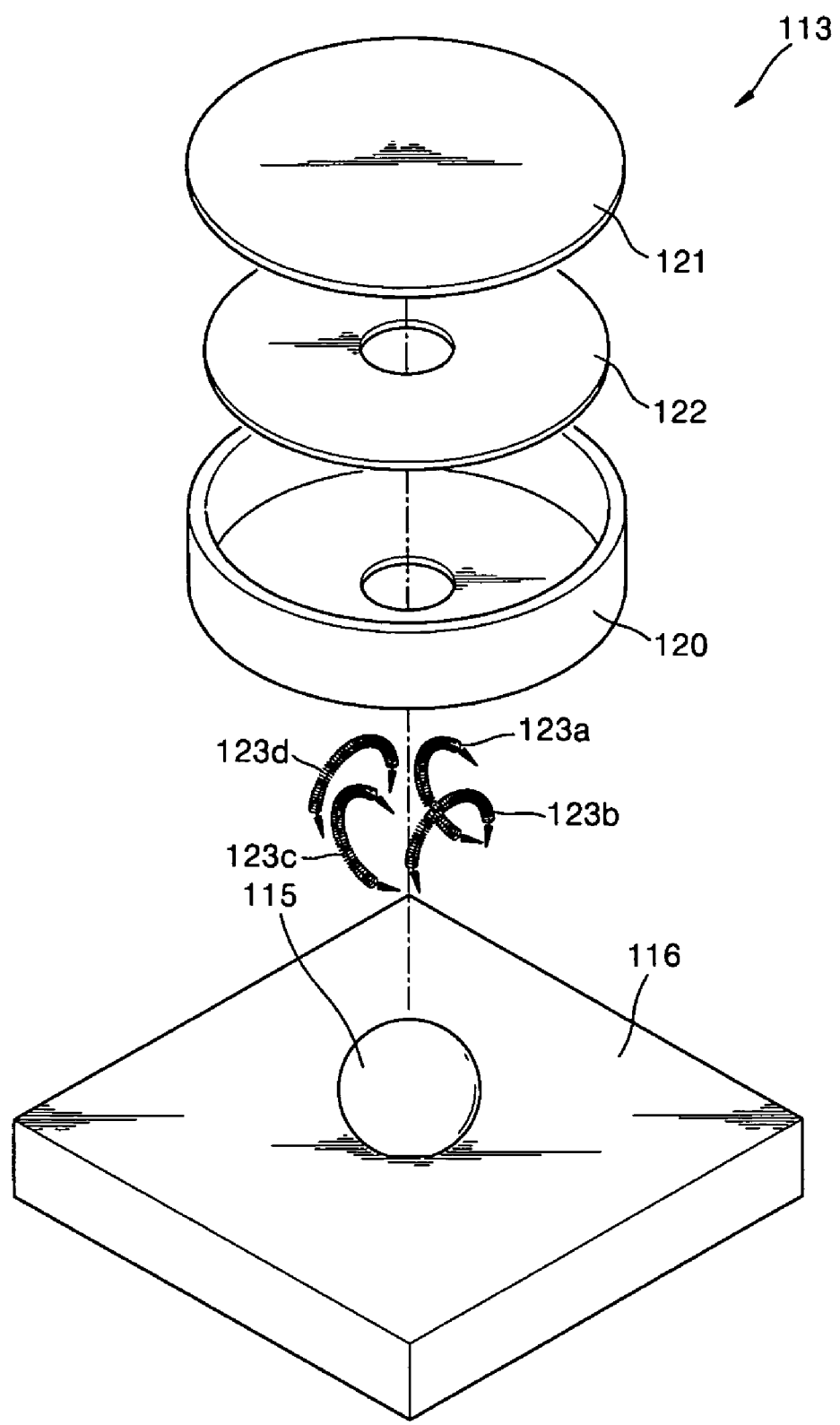
FIG. 9 is an exploded perspective view of a model of the upper member of the SASM in FIGS. 6A through 6C obtained by using ADAMS (commercially available from MSC. Software Corporation)

FIG. 9 is an exploded perspective view of a model of the upper member 113 of the SASM 112a in FIGS. 6A through 6C obtained by using ADAMS (commercially available from MSC. Software Corporation).

As shown in FIG. 9, the upper member 113 includes a body 120, an upper cover 121, and a disk spring 122. The disk spring 122 made of titanium is placed inside the body 120 to contact the spherical joint 115. The upper cover 121 is secured to the body 120 by a screw (not shown). In addition, the spherical joint 115 includes a plurality of rotational springs 123a through 123d and is engaged with an internal surface of the body 120.

According to an embodiment of the present invention, the disk spring 122 has an outer diameter of about 60 mm and an inner diameter of about 14 mm, the spherical joint 115 has a radius of 10 mm, the lower portion of the body 120 is formed with a hole having a radius smaller than the radius of the spherical joint 115, and the radius of the hole is preferably about 7 mm.

A space formed in the body 120 between the upper portion of the body 120 and the lower portion of the disk spring 122 is filled with a soft foam having a high damping value and a small elasticity coefficient as compared to the disk spring stiffness.

An operating principle of the foot structure 109 according to the embodiment of the present invention will now be described.

First, the foot structure 110 has 6 degrees of freedom (DOF) and 32 passive rigid-body DOF, since the foot structure 110 has four SASMs 112a through 112d and each of the SASMs 112a through 112d has 8 DOF (5 DOF due to five linear springs and 3 DOF due to the spherical joint).

In addition, the foot structure 110 has a nonlinear stiffness characteristic similar to a human foot due to the plurality of SASMs 112a through 112d installed under the carrier plate 111.

An operating principle of one of the SASMs 112a through 112d is as follows.

First, the spherical joint 115 fixed on the lower cover 116 contacts the disk spring 122 to provide a passive rotation DOF between the upper and lower members 113 and 114. In addition, in order to stabilize the lower member 114 in an equilibrium state, four rotational springs are provided between the spherical joint 115 and an inner surface of the upper cover 121. Such a passive rotation DOF allows the foot of the humanoid robot 100 to smoothly contact the floor. Also, the humanoid robot 100 is less sensitive to an irregular floor. Furthermore, the contact between the foot's sole and the ground is more effective when the foot's sole is pushed against the ground.

Second, a passive translation DOF between the upper and lower members 113 and 114 is provided by the five independently movable portions 118 and 119a through 119d that contact the inner surface of the lower cover 116 by the linear springs 117a through 117e. In addition, in order to achieve an effective contact between the foot's sole and the floor, the five independently movable portions 118 and 119a through 119d are covered by a layer made of rubber 126a through 126e. Accordingly, the independent movable portions 118 and 119a through 119d movable independently can independently move with respect to each other.

Third, the stiffness of the linear springs 117a through 117e is calculated by the following method.

Supposing that a total weight of the humanoid robot 100 is Q=1000 N, the nominal force applied to each SASM is P=125 N (=1000 N/8). As such, the force applied to each central portions of the carrier plate 111 is equal to Q/2. In this case, the lower cover 116 of the SASM completely contacts the inner surfaces of the central independent portion 118. Accordingly, assuming that nominal displacements of the independent movable portions are equal to d=5 mm, the stiffness (Clin) of the linear springs is 5 N/mm (=P/d/5), and the stiffness (Clower) of the lower member 114 of the SASM is 25 N/mm (=5Clin).

Figure 10:
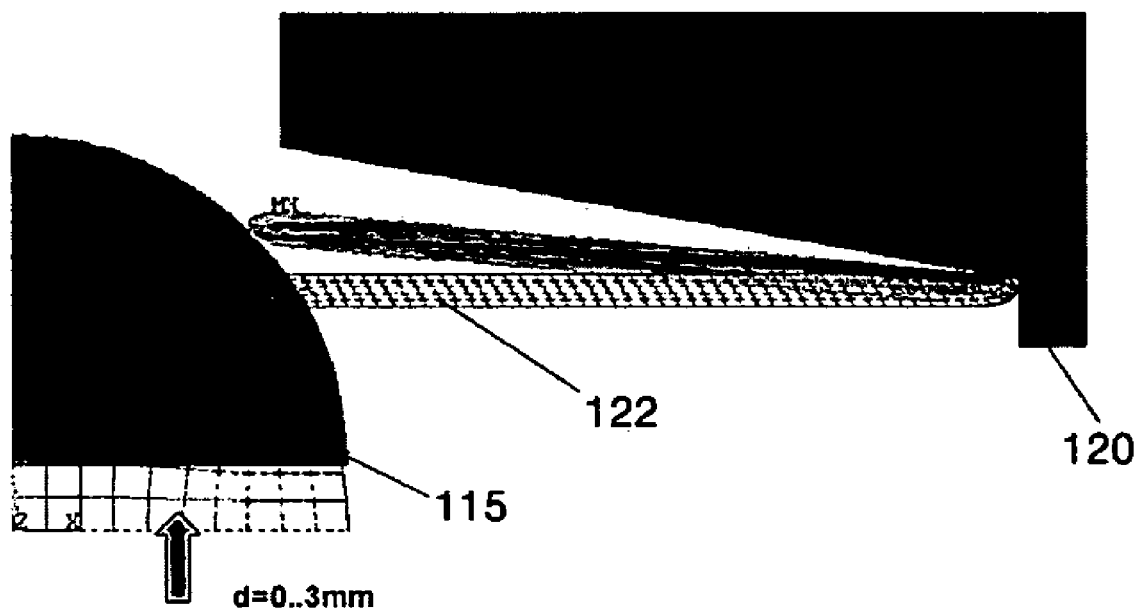
FIG. 10 is a view obtained by using ANYSYS 6.0 (commercially available from ANYSYS Inc.) for explaining how to calculate a stiffness of the disc spring in FIG. 9.

FIG. 10 a view for explaining how to calculate the stiffness of the disc spring 122 in FIG. 9.

In FIG. 10, a non-linear finite element analysis is implemented by using ANYSYS 6.0 (commercially available from ANYSYS Inc.), to calculate the stiffness (Cdisk) of the disk spring 122.

Figure 11:
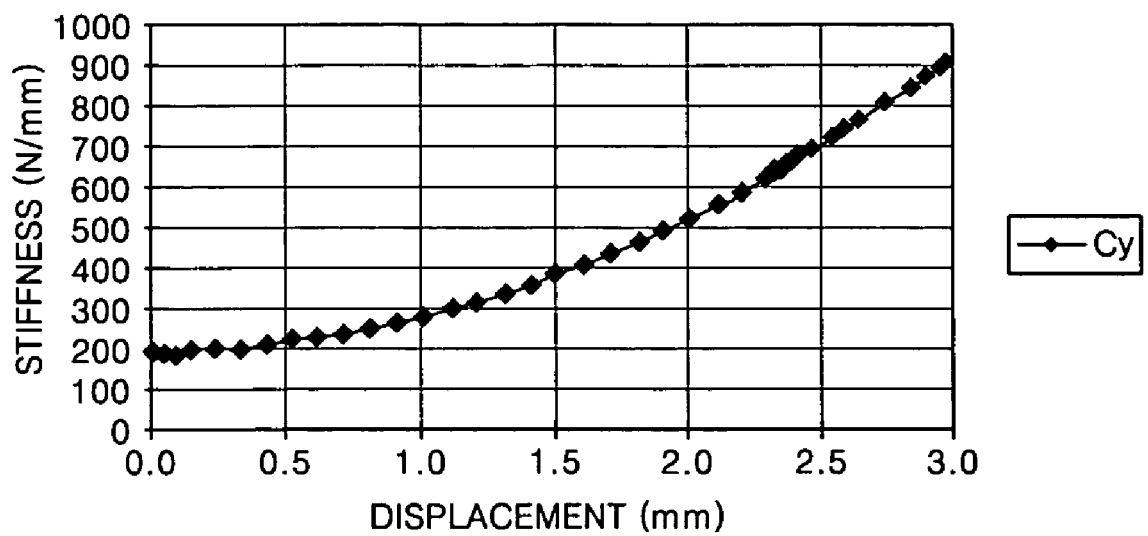
FIG. 11 is a graph depicting a stiffness curve of the disk spring in FIG. 9 obtained on the assumption that the disk spring operates within a displacement range of 3 mm.

Supposing that the disk spring 122 operates in a displacement range of 0-3 mm, a stiffness curve of the disk spring 122 is indicated in FIG. 11. In result, the higher impact forces are taken by the much stiffer titanium disk spring 122, stiffness curve of which was calculated from the finite element solution and is pictured here.

Figure 12:
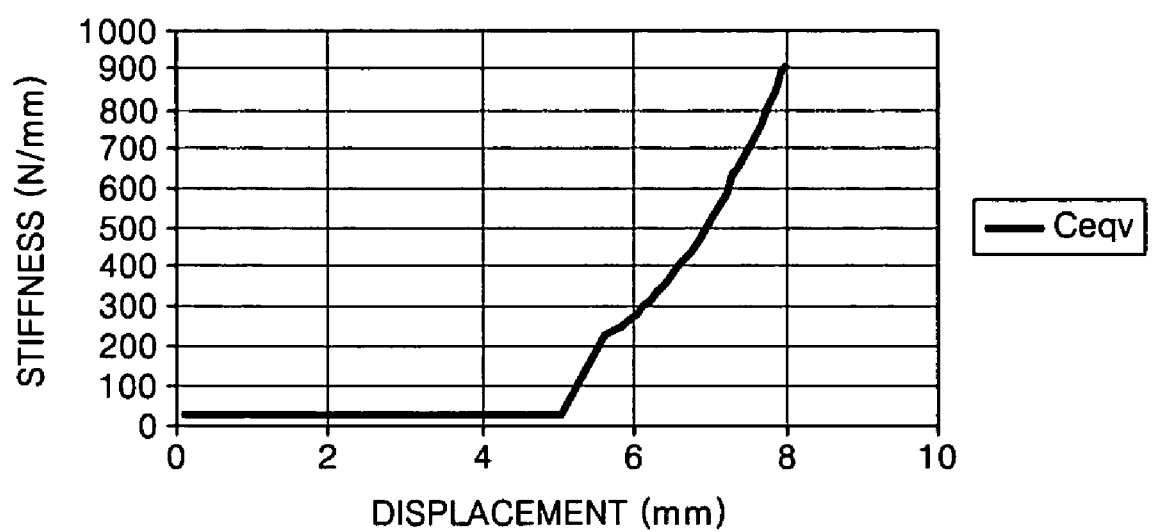
FIG. 12 is a graph depicting a stiffness curve of the SASM within the overall displacement range.

FIG. 12 is a graph of a stiffness curve of the SASM within the overall displacement range, in which the x-axis indicates a displacement, and the y-axis indicates the stiffness.

The graph in FIG. 12 is obtained using the following equations.

$$C_{eqv}(d) = \frac{C_{lower} \cdot C_{disk}(d)}{C_{lower} + C_{disk}(d)}, d < D_{nom} = 5 \text{ mm} \quad \text{Equation 1}$$

$$C_{eqv}(d) = C_{disk}(d), d \geq D_{nom} = 5 \text{ mm} \quad \text{Equation 2}$$

wherein, $C_{eqv}(d)$ indicates the total stiffness, $C_{lower}$ indicates a stiffness of the lower member 114, $C_{disk}(d)$ indicates a stiffness of the disk spring 122, and $D_{nom}$ indicates a nominal displacement. Equation 1 and equation 2 are respectively applied in cases where the nominal displacement is larger than 5 mm and smaller than 5 mm.

Although the foot structure 110 of the humanoid robot 100 includes four SASMs, each of which includes five independent portions, it is possible to provide more or less SASMs.

In addition, although the carrier plate 111 has a concave shape and each of the SASMs is constructed in such a way that the entire independent portions contacting the bottom portion has a rectangular shape, carrier plate 111 and the independent portions may have other shapes.

Figure 13:
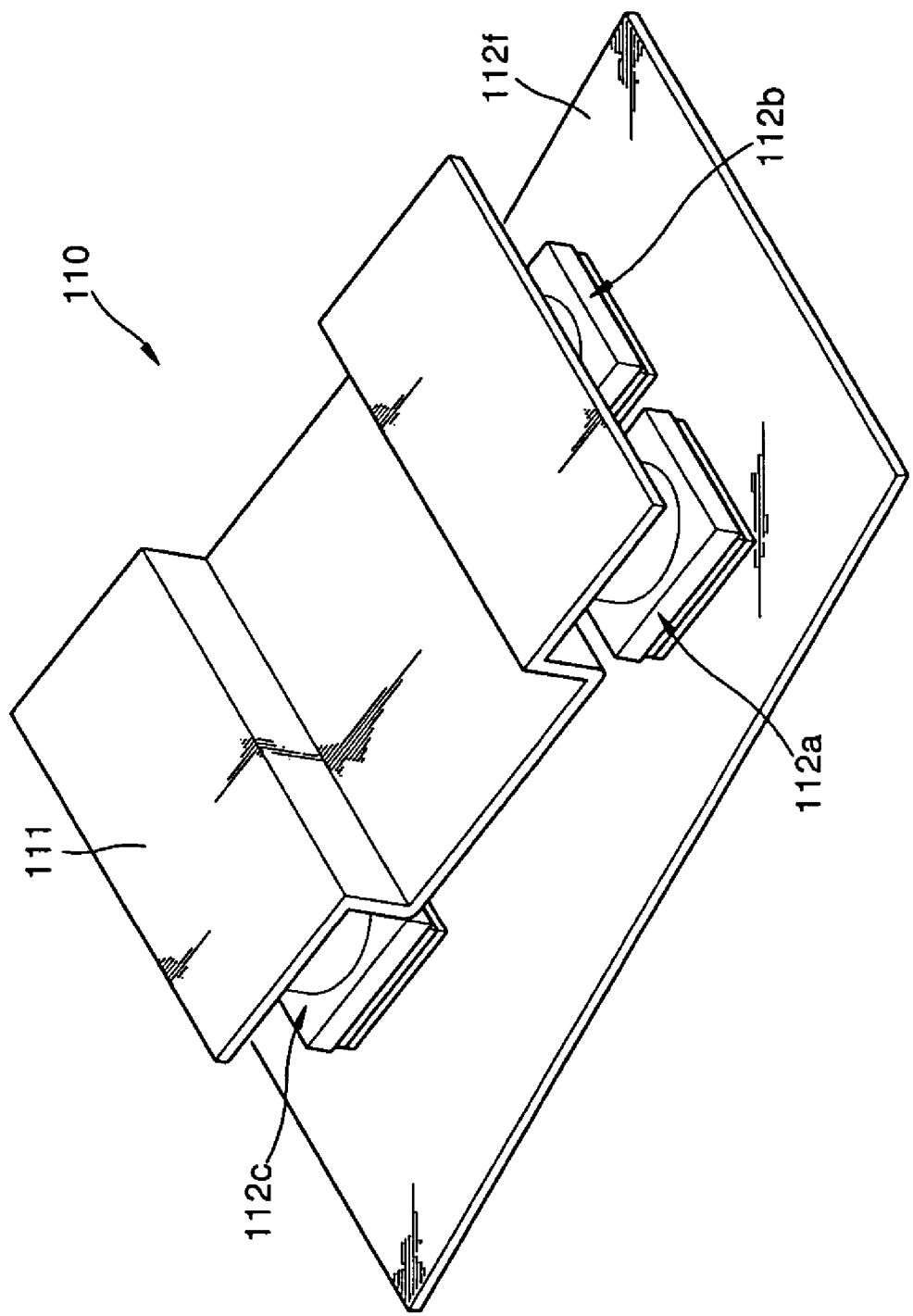
FIG. 13 is a view depicting landing the foot structure according to the embodiment of the present invention on uneven ground.

FIG. 13 is a view depicting landing the foot structure 110 on uneven ground.

Figure 14:
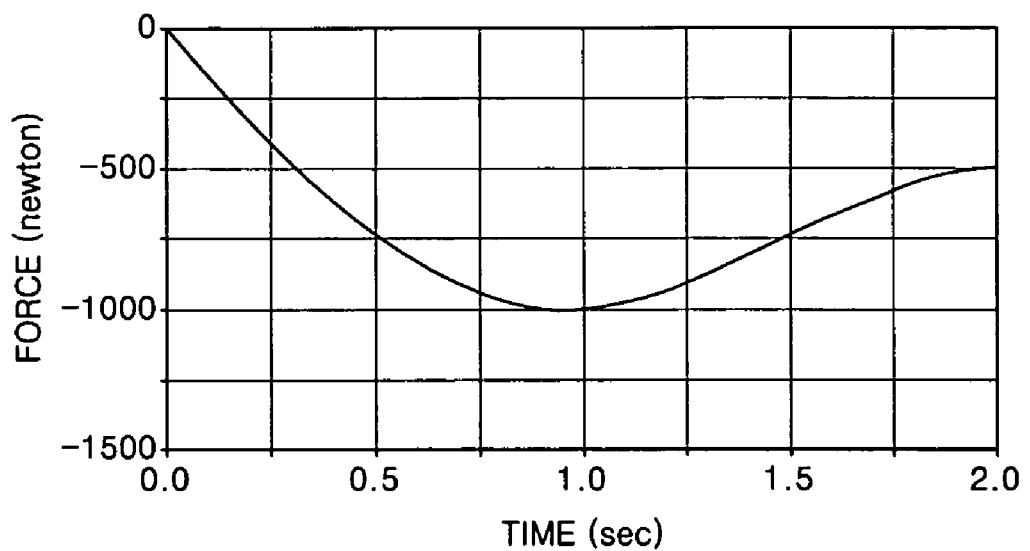
FIG. 14 is a graph of a force applied to an upper center portion of a carrier plate in the foot structure of FIG. 13 versus time.

FIG. 14 is a graph of an applied force to an upper center portion of the carrier plate 111 in the foot structure 10 of FIG. 13 versus time. FIG. 14 shows that an initial vertical speed of the foot structure 110 is 100 mm/s.

Figure 15:
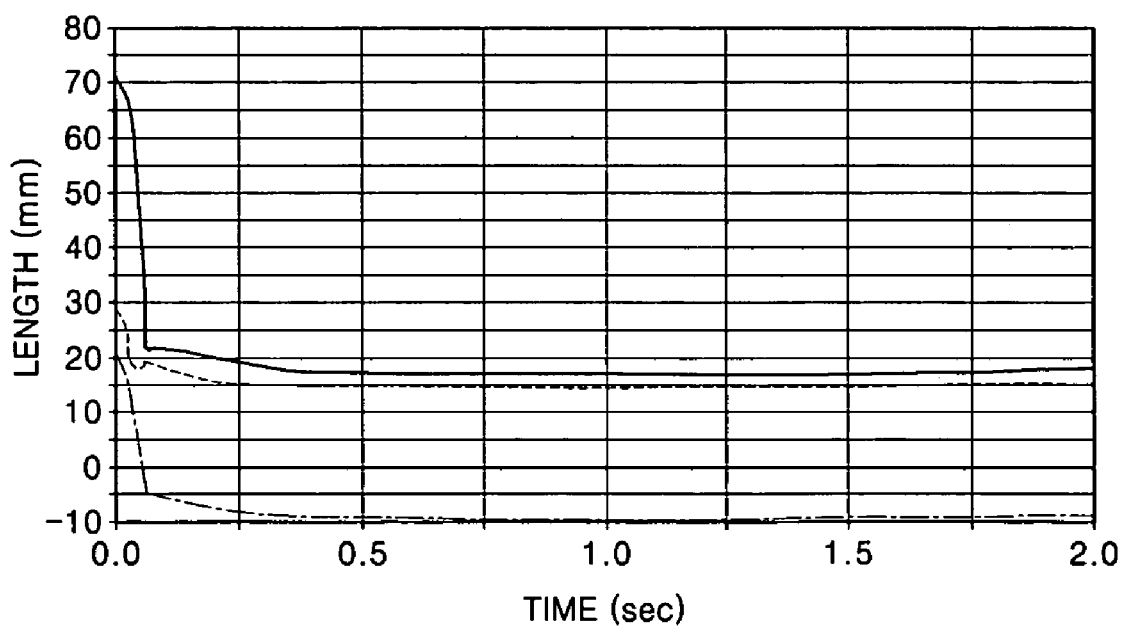
FIG. 15 is a graph of a vertical displacement of an upper member of the foot structure versus time.

FIG. 15 is a graph of a vertical displacement of the upper member 113 of the foot structure 110 of FIG. 13 versus time.

Referring to FIG. 15, a solid line indicates a vertical displacement of a toe, a dotted line indicates a vertical displacement of an ankle joint, and a one-dotted line indicates a vertical displacement of the heel of the foot structure 110.

Figure 16:
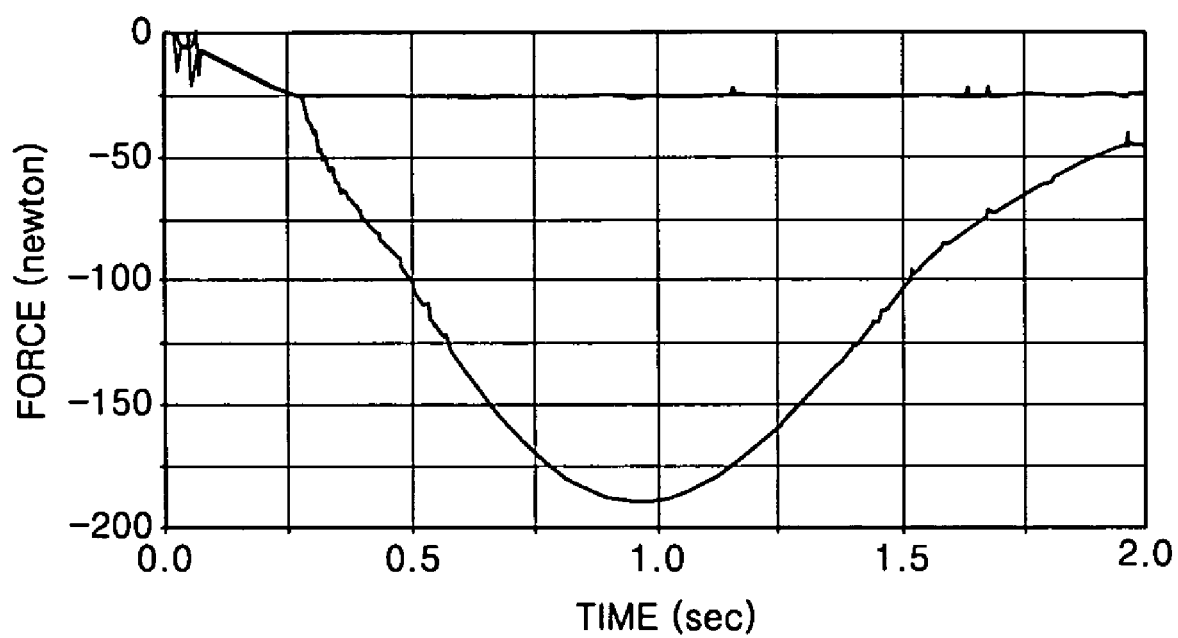
FIG. 16 is a graph of a contact force between a lower surface of a heel of the foot structure of FIG. 13 and the uneven ground versus time.

FIG. 16 is a graph of a contact force between a lower surface of the heel of the foot structure 110 of FIG. 13 and the uneven floor versus time.

While the present invention has been particularly shown and described with reference to exemplary embodiments depicted in the drawings, it will be understood by those of ordinary skill in the art that various changes and modifications in form and details may be made therein without departing from the spirit and scope of the present invention. Therefore, the true spirit and scope for protection of the present invention will be defined by the following claims.

What is claimed is:

1. A foot structure for a humanoid robot, the foot structure comprising:
    a support for mounting an ankle joint of the humanoid robot; and
    a plurality of lower structures connected to a bottom portion of the support, wherein each of the lower structures includes:
    an upper member connected to the bottom portion of the support;
    a lower member having a plurality of independent portions each movably connected to the lower member; and
    a revolute joint for coupling the upper member and the lower member, wherein the lower member includes:
    a lower cover; and
    a plurality of linear springs for movably coupling the independent portions to the lower cover,
    wherein the independent portions are disposed toward the ground.

2. The foot structure of claim 1, wherein the support includes a force sensor.

3. The foot structure of claim 1, wherein each independent portion includes a metal portion connected to one of the linear springs and a rubber portion that contacts the ground.

4. The foot structure of claim 3, wherein the lower member includes an independent portion of a rectangular shape placed in a center portion of the lower structure and four independent portions symmetrically arranged around the independent portion.

5. The foot structure of claim 1, wherein the upper member includes:
a body;
an upper cover covering the body; and
a disk spring displaced between the body and the upper cover.

6. The foot structure of claim 5, wherein a circular opening is formed in a lower surface of the body and the disk spring.

7. The foot structure of claim 5, wherein the independent portions provide a degree of freedom for a translation motion in a direction perpendicular to a surface of the foot structure contacting the ground.

8. The foot structure of claim 5, wherein if a nominal force applied to the foot structure is within a desired range, a total stiffness of a mechanism is determined by the following equation:

$$C_{eqv}(d) = \frac{C_{lower} \cdot C_{disk}(d)}{C_{lower} + C_{disk}(d)}, d < D_{nom} = 5 \text{ mm}$$

wherein, $C_{eqv}$, (d) indicates the total stiffness of a mechanism, $C_{lower}$ indicates a stiffness of the lower member, $C_{disk(d)}$ indicates a stiffness of the disk spring, and $D_{nom}$ indicates a nominal displacement.

9. The foot structure of claim 8, wherein if a nominal force applied to the foot structure is within a desired range, a total stiffness of the mechanism is determined by the following equation:

$$C_{eqv}(d) = C_{disk}(d), d \geq D_{nom} = 5 \text{ mm}$$

wherein, $C_{eqv}(d)$ indicates the total stiffness of the mechanism, $C_{lower}$ indicates a stiffness of the lower member, $C_{disk}(d)$ indicates a stiffness of the disk spring, and $D_{nom}$ indicates a nominal displacement.

10. A humanoid robot including at least one body and a plurality of legs each having a foot structure connected to the body, the foot structure comprising:
a support for mounting an ankle joint of the humanoid robot; and
a plurality of lower structures connected to a bottom portion of the support, wherein each of the lower structures includes:
an upper member connected to the bottom portion of the support;
a lower member having a plurality of independent portions each movably connected to the lower member; and
a revolute joint for coupling the upper member and the lower member, wherein the lower member includes:
a lower cover; and
a plurality of linear springs for movably coupling the independent portions to the lower cover,
wherein the independent portions are disposed toward the ground.

11. The humanoid robot of claim 10, wherein the support is made of metal and includes a force sensor.

12. The humanoid robot of claim 10, wherein each of the independent portions includes a metal portion connected to the linear spring and a rubber portion that contacts the ground.

13. The humanoid robot of claim 12, wherein the lower member includes an independent portion of a rectangular shape placed in a center portion of the lower structure and four independent portions symmetrically arranged around the independent portion.

14. The humanoid robot of claim 10, wherein the upper member includes:
a body;
an upper cover covering the body; and
a disk spring placed between the body and the upper cover.

15. The humanoid robot of claim 14, wherein a circular opening is formed in a lower surface of the body and the disk spring.

16. The humanoid robot of claim 15, wherein each of the lower members further includes a revolute joint for coupling the upper member to the lower member, and a diameter of the joint is larger than that of the circular opening.

17. The humanoid robot of claim 14, wherein the plurality of independent portions provides a degree of freedom for a translation motion in a direction perpendicular to a surface of the foot structure contacting the ground.

18. A foot structure for a humanoid robot, the foot structure comprising:
a support for mounting an ankle joint of the humanoid robot; and
a plurality of lower structures connected to a bottom portion of the support, wherein each of the lower structures includes:
an upper member connected to the bottom portion of the support;
a lower member having a plurality of independent portions each movably connected to the lower member; and
a revolute joint for coupling the upper member and the lower member, wherein the lower member includes:
a lower cover; and
a plurality of linear springs for movably coupling the independent portions to the lower cover, wherein the upper member includes:
a body;
an upper cover covering the body; and
a disk spring displaced between the body and the upper cover, wherein if a nominal force applied to the foot structure is within a desired range, a total stiffness of a mechanism is determined by the following equation:

$$C_{eqv}(d) = \frac{C_{lower} \cdot C_{disk}(d)}{C_{lower} + C_{disk}(d)}, d < D_{nom} = 5 \text{ mm}$$

wherein, $C_{eqv}(d)$ indicates the total stiffness of a mechanism, $C_{lower}$ indicates a stiffness of the lower member, $C_{disk}(d)$ indicates a stiffness of the disk spring, and $D_{nom}$ indicates a nominal displacement.

* * * * *

UNITED STATES PATENT AND TRADEMARK OFFICE
CERTIFICATE OF CORRECTION

PATENT NO. : 7,650,203 B2  
APPLICATION NO. : 11/024815  
DATED : January 19, 2010  
INVENTOR(S) : Leonid Maslov et al.

Page 1 of 1

It is certified that error appears in the above-identified patent and that said Letters Patent is hereby corrected as shown below:

In the claims

Column 9, Line 23, change "$C_{eqv},(d)$" to --$C_{eqv}(d)$--.

Signed and Sealed this  
Fifth Day of January, 2016

Michelle K. Lee  
*Director of the United States Patent and Trademark Office*